T. L. Chase.
Copying Press.
N° 51,019.   Patented Nov. 21, 1865.
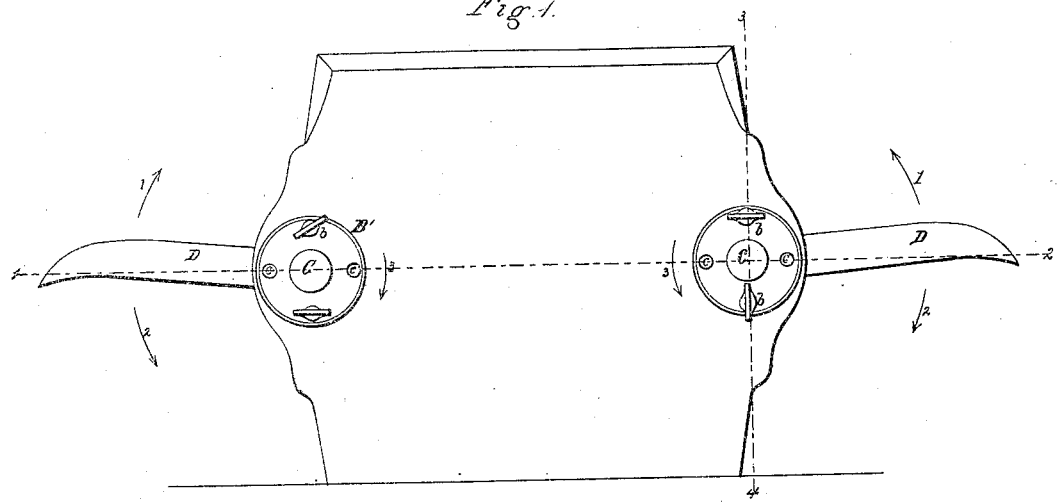
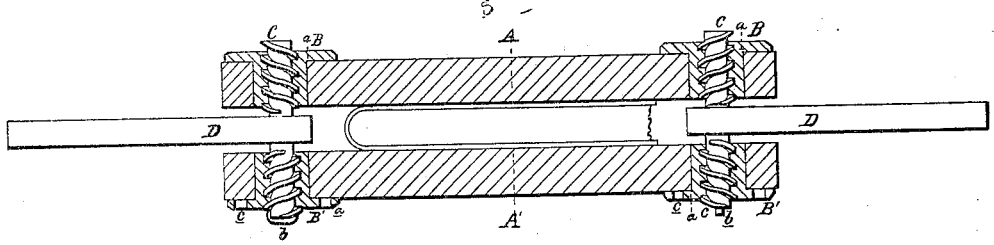
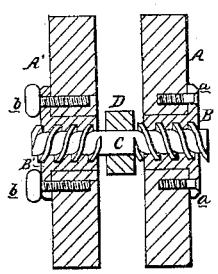
Witnesses:
Inventor:

UNITED STATES PATENT OFFICE.

THEODORE L. CHASE, OF PHILADELPHIA, PENNSYLVANIA.

PORTABLE PRESS.

Specification forming part of Letters Patent No. 51,019, dated November 21, 1865.

*To all whom it may concern:*

Be it known that I, T. L. CHASE, of Philadelphia, Pennsylvania, have invented an Improved Portable Press; and I do hereby declare the following to be a full, clear, and exact description of the same, reference being had to the accompanying drawings, and to the letters of reference marked thereon.

My invention consists of certain plates, screws with right and left handed threads, and handles or arms, the whole being arranged for joint action, substantially as described hereinafter, and forming a cheap, simple, and portable press for copying letters and other purposes.

My invention further consists of certain adjustable nuts combined with the said plates and screws, substantially as described hereinafter, so that the distance between the said plates may be regulated at pleasure.

In order to enable others to make and use my invention, I will now proceed to describe its construction and operation.

On reference to the accompanying drawings, which form a part of this specification, Figure 1 is a side elevation of my improved portable press; Fig. 2, a section on the line 1 2, Fig. 1; and Fig. 3 a section on the line 3 4, Fig. 1.

A and A' are plates of wood or metal, in each of which, near each end, is a circular opening adapted for the reception of a cylindrical nut, B or B', a flange, a, at the outer edge of the latter, bearing against the outer side of the plate A or A' in which the nut is secured. The nuts B are permanently secured to the plate A in any suitable manner, the nuts B' attached to the plate A', however, are secured by thumb-screws b, and in the flanges a of each of these nuts B' are additional openings c c, for a purpose described hereinafter. In each of the nuts B is a thread adapted to a left-handed thread of a screw, C, which passes through the said nut, there being a right-handed thread on the opposite end of the screw, which passes through the opposite nut, B', and to the center of the screw is secured the end of an arm, D.

When the plates A A' are brought to the position shown in Fig. 1, and the arms with the screws C are turned in the direction of the arrows 1, Fig. 1, the action of the screws will separate the plates, and a copying-book or other article to be pressed may be introduced between them.

It should be understood that in using the press it is placed with its edge on a table or desk, (as seen in Fig. 1,) so that when the arms are depressed simultaneously, and the plates consequently brought toward each other, in order to compress the object between them, the power exerted on the arms will have no tendency to disturb the position of the press, but, on the contrary, will tend to maintain it steadily in its position on the table.

Should it be found that the plates A A', when separated to their greatest extent, are still too near together to admit an article of the size desired, the thumb-screws b are removed from the openings through which they pass, the nuts B' are turned a part of a revolution in the direction of the arrows 3, Fig. 1, until the openings c c coincide with the screw-openings in the plate A', when the screws b are again inserted until the flanges a are brought close against the plate A', the distance between the latter and the plate A being thus increased in proportion to the distance the nuts have been carried toward the outer ends of the screws.

It will be seen that in a press of this construction the copying-book or other article to be pressed may be subjected to any amount of pressure required in such instances without the exercise of any excessive exertion on the part of the operator, and that it may be readily adjusted to receive articles of different dimensions. The press is also light in weight, compact, and may be readily taken apart and put together when desired. It is simple in its construction, cheap, and not liable to get out of order.

I wish it to be understood that I do not desire to claim, broadly, the plates, and the screws with left and right handed threads for moving the said plates to and from each other by turning said screws, such a device having been heretofore used in cotton-presses; but

I claim as my invention, and desire to secure by Letters Patent—

1. The combination of the screws C, with their left and right handed threads, their arms or handles D, and the plates A and A', the whole being arranged for joint action substantially as set forth.

2. The adjustable nuts B', combined with the plates A A' and screws C, substantially as and for the purpose herein set forth.

In testimony whereof I have signed my name to this specification in the presence of two subscribing witnesses.

THEODORE L. CHASE.

Witnesses:
CHARLES E. FOSTER,
W. W. DOUGHERTY.